March 14, 1961 G. P. KELLEY 2,974,336
ADJUSTABLE DOCKBOARD
Filed May 9, 1960 3 Sheets-Sheet 1

Inventor
Garrett P. Kelley

March 14, 1961

G. P. KELLEY 2,974,336

ADJUSTABLE DOCKBOARD

Filed May 9, 1960

Inventor
Garrett P. Kelley
Attorney

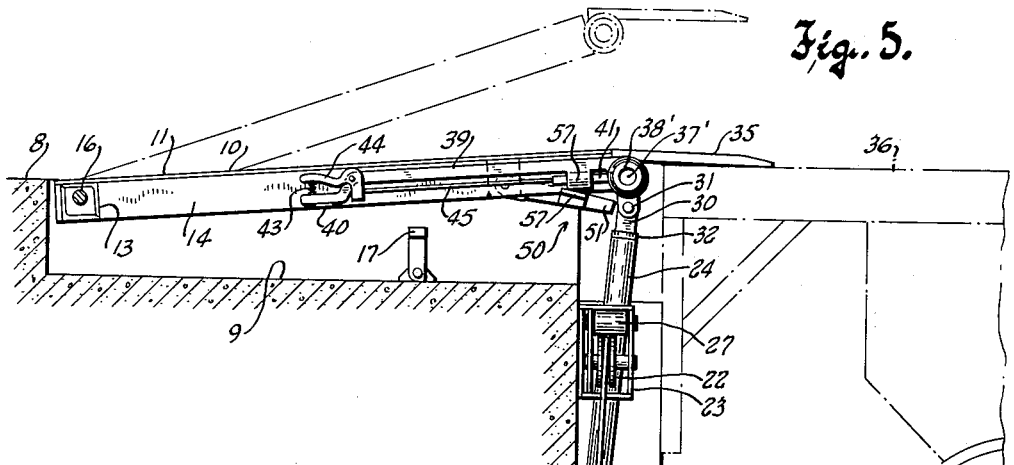
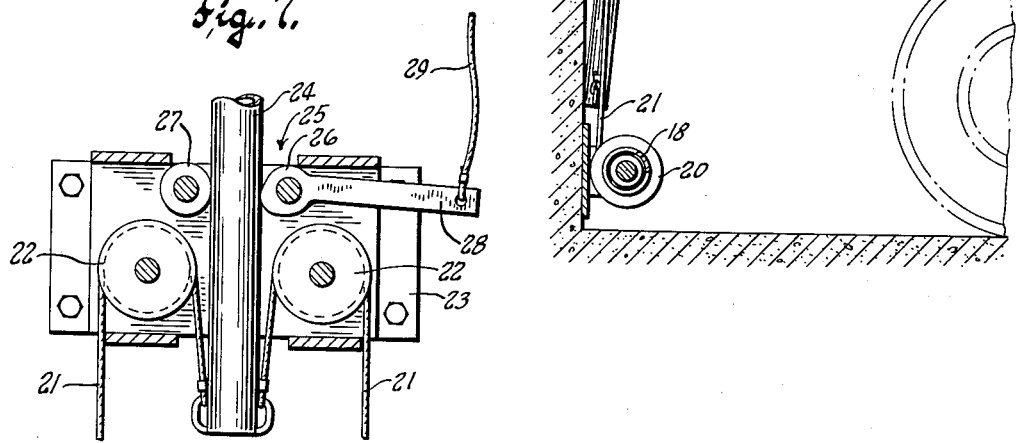
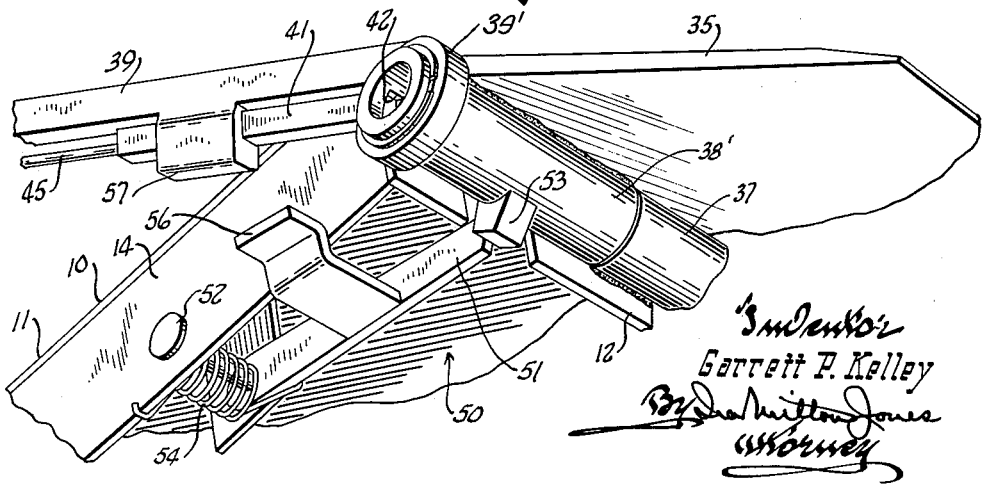

United States Patent Office 2,974,336
Patented Mar. 14, 1961

2,974,336
ADJUSTABLE DOCKBOARD
Garrett P. Kelley, Milwaukee, Wis., assignor to Kelley Company, Inc., Milwaukee, Wis., a corporation of Wisconsin Filed May 9, 1960, Ser. No. 26,509
10 Claims. (Cl. 14—71)

This invention relates generally to adjustable dockboards used to span the space between a dock or loading platform and a carrier in loading or unloading position in front of the dock or platform, and the instant application is a continuation in part of the applicant's pending application Serial No. 808,993, filed April 27, 1959, now abandoned.

More specifically, the invention is concerned with dockboards of the type wherein a ramp hingedly mounted at its rear edge to the dock or loading platform, is yieldingly biased to an upwardly inclined position, and one of its objects is to provide an improved self-energizing locking device to securely, though releasably restrain the biasing force and thereby prevent unintentional elevation of the ramp from a desired lowered position.

Another object of this invention is to provide an extension lip hinged to the front edge of the ramp to be movable from a position hanging down from the front edge of the ramp to an elevated operative position forming a coplanar extension of the ramp, in which position it comes to rest upon the bed or floor of a carrier in loading or unloading position as the ramp is lowered from a raised position, it being understood that the angle of this lowered position of the ramp depends upon the difference in elevation between the carrier floor and the platform level.

Another object of this invention is to provide reliable and easily manipulated mechanically acting means for swinging the extension lip from its dependent position to a raised position, and for releasably latching the extension lip in such raised position. In this connection, it is a feature of this invention that the lip may be swung to a raised position and/or lowered even while a carrier is in loading or unloading position.

Another object of this invention is to provide means for releasing the latch by which the extension lip is held in the raised position to which it has been swung, which latch releasing means functions in consequence of the weight of the extension lip being borne by the carrier as the extension lip comes to rest upon its floor, so that the extension lip automatically drops to its dependent position when the carrier pulls away.

It is also an object of this invention to provide means for automatically holding the ramp in any selected position below its maximum elevated position without, however, interfering with elevation of the ramp as a result of the truck or carrier bed moving upwards as the load thereon decreases.

Finally, it is an object of this invention to provide an adjustable dockboard which is so designed and constructed that when in its inoperative position it presents no interference whatsoever with traffic across the loading platform; allows overhead doors to be closed without danger of damage due to the ramp being unintentionally released for elevation by the biasing force acting thereon; avoids unsightly dock openings; and enables trucks or other carriers to be spotted at any time—night or day—without requiring the presence of a dock attendant.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

Figure 5 is a cross sectional view similar to Figure 2 showing the ramp lowered to its operative position and the extension lip forming a continuation of the ramp and resting upon the bed or floor of the truck;

Figure 6 is a perspective view of a portion of the front end of the ramp to better illustrate the structure by which the extension lip is raised and releasably held in raised position; and Figure 7 is a vertical sectional view of the ramp lifting mechanism, and the locking means therefore, with the section taken just inside the front cover thereof.

Figure 1:
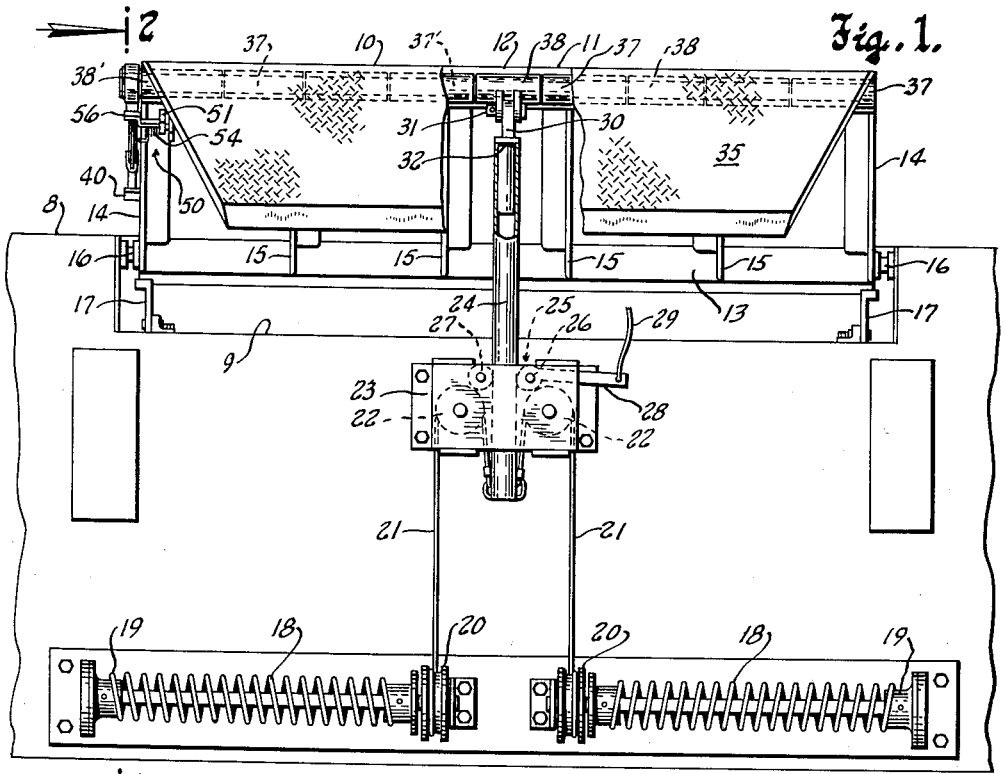
Figure 1 is a view in front elevation of a dockboard installation embodying this invention, with the ramp shown in its elevated position.

Referring now more particularly to the accompanying drawings in which like numerals refer to like parts in the several views, the numeral 8 designates a loading platform or dock of any conventional construction but provided with a relatively shallow depression or pocket 9 in which the adjustable dockboard or ramp 10 of this invention is mounted. This dockboard or ramp consists essentially of a sheet or plate 11 of steel decking, welded or otherwise secured to the top of a structural frame having front and rear cross members 12 and 13, respectively, side rails 14, and a plurality of intermediate longitudinally extending rails 15.

The rear edge of the ramp is hingedly connected, in any suitable manner, as at 16, to the dock or platform, and the hinge axis is so placed that the ramp may occupy a position flush with the top of the dock or platform, and resting upon supports 17. These supports are arranged to be swung out of the way to allow the ramp to assume a downwardly inclined position to accommodate carriers in which the floors or beds are at a level below the top of the dock or platform.

Figure 2:
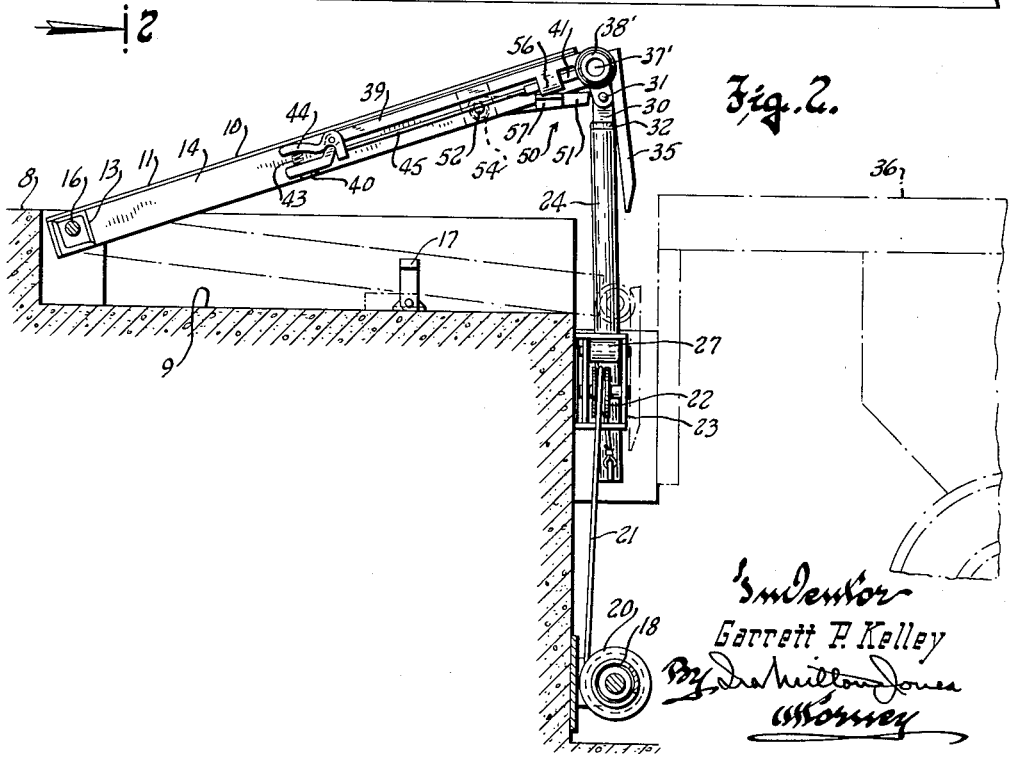
Figure 2 is a cross sectional view taken generally along the plane of the line 2—2 in Figure 1.

The ramp is yieldingly biased to a raised position shown in Figures 1 and 2, by a pair of torsion springs 18 mounted on the front face of the dock or platform near the bottom thereof. The outer ends 19 of these springs are anchored. Their inner or adjacent ends are connected to drums 20, to which steel cables 21 are secured to be wound thereon by the tension stored in the springs.

The cables 21 are reeved over pulleys 22 freely journalled in a frame 23 which is fixed to the front face of the dock or platform directly beneath the depression 9, and centrally between the sides thereof. The ends of the cables are attached to the lower end of a strut 24 which is slidably mounted in the frame 23 for up and down movement so that the tensioned springs bias the strut upwardly, and since the upper end of the strut is connected to the front edge of the ramp, the tensioned springs at all times tend to raise the ramp to its upwardly inclined position by winding the cables onto the drums 20. The tension of the springs is so adjusted that the upward bias they impart to the ramp exceeds the weight thereof by something less than the weight of a man, so that the ramp can be lowered by simply walking out onto the ramp. However, unless the spring tension is restrained in some way, the ramp will again rise to its elevated position as soon as the attendant steps off it.

Such restraint upon the spring bias is conveniently applied by a releasable holding device 25 arranged to grip the strut and secure it against upward movement. This holding device comprises a cam 26 pivotally mounted in the frame 23 to engage the adjacent side of the strut and wedge the strut between it and a backup roller or support 27 also carried by the frame 23. A lever 28 fixed to the cam 26 projects laterally therefrom and by its weight biases the cam into gripping engagement with the strut. The shape of the cam is such that it is self-energizing, and as a result its grip upon the strut tightens with an increase in the upward force applied to the strut.

Release of the strut from the holding device may be effected by simply manually lifting the lever 28, or applying a pull on a lanyard 29 attached to the lever and led to a point convenient to an attendant on the dock or platform.

While the strut 24 may be secured against upward movement in any lowered position by the cam 26, the ramp must be free to move upward within the range of its permitted travel. Accordingly, the connection between the upper end of the strut 24 and the ramp is unidirectional. It allows the strut to carry its proportionate share of the weight of the ramp but, at the same time, permits the ramp to move upward with respect to the strut. These requirements are conveniently met by having the connection between the strut and the ramp provided by a pin 30 pivoted to the underside of the ramp, as at 31, and slidably received in the strut which is hollow and preferably a tube. A flange or other abutment 32 on the pin rests upon the upper end of the strut to impart the weight of the ramp to the strut, and since the pin slides freely in the strut, it follows that the pin and the ramp are free to move upward with respect to the strut.

The manner in which the torsion springs 18 function to bias the ramp upwardly and the way in which the cam 26 acts to restrain the springs and prevent unintentional elevation of the ramp from any required lowered position are important features of this invention.

Another feature of the invention is its provision of an extension lip 35 hingedly connected to the front edge of the ramp to be removable from an inoperative position hanging down from the front edge of the ramp, as in Figure 2, to an elevated operative position, as shown in Figure 5, where it forms a coplanar extension of the ramp and serves to bridge the gap between the ramp and the floor or bed 36 of a truck or other carrier in loading or unloading position in front of the dock.

While ramps of adjustable dockboards have been heretofore equipped with extension lips, where they were provided the extension lips were either permanent projections on the ramps, or, if hinged thereto, either had to be manually lifted and held in a raised position while the truck or carrier backed into position—or, as in the Watson Patent No. 2,714,735, were hydraulically raised and lowered.

All these past constructions have inherent disadvantages which the present invention overcomes. Having the extension lip permanently fixed in its raised or extended position presents a hazard because of its projection beyond the front of the dock and also makes the lip vulnerable to damage. Having to manually lift the extension lip, or apron as it is sometimes called, and hold it up while the truck or carrier backs into position, has obvious disadvantages in addition to the danger to which this operation subjects the attendant, or attendants; and using hydraulic actuators to raise and lower the extension lip introduces an objectionable element of cost and a source of trouble.

All these disadvantages of the prior structures are overcome with this invention through its provision of a simple mechanical device which enables an attendant standing on the dock or platform to bring the extension lip to a predetermined raised position, and a simple automatic latch mechanism to hold the extension lip in such predetermined raised position until the ramp is lowered and the lip comes to rest upon the bed or bottom of the truck or carrier.

As perhaps best seen in Figure 1, the hinge connection between the ramp and its extension lip comprises a series of short alternately arranged or interengaged tubes 37 and 38 fixed to the front of the ramp and the underside of the extension lip 35, respectively and a pintle 37' received in these tubes. It should be noted that the tubes 37 and 38 are so located on the ramp and the extension lip that a knuckle hinge is formed which limits the angle through which the extension lip may be raised to the height at which it forms a coplanar extension of the ramp and the rear edge of the lip abuts the front of the ramp. It is this knuckle-joint characteristic of the hinge connection between the extension lip and the ramp, and the fact that the front end of the ramp merely rests upon the top of the strut 24, which permits the ramp to rise with the bed of the truck or carrier 36 as the load on the latter decreases and its springs lift the truck or carrier body.

One of the endmost tubes fixed to the lip and designated 38' (see Figure 6) projects beyond the adjacent side edge of the ramp and has the hub 39' of an operating handle 39 freely rotatably journalled thereon. The handle is suitably held against displacement from the tube 38' in any suitable manner, as for instance by a snap ring seated in a groove in the tube. When not in use, the handle occupies an out-of-the-way position alongside the ramp, defined by a stop 40 upon which the handle rests.

A locking pin 41 slidably mounted on the handle is projectable through a hole in the hub of the handle and into a hole or keeper 42 in the tube 38' when the handle is lifted to bring the locking pin into alignment with the hole or keeper 42. A spring 43 acting upon a squeeze-grip 44 which is pivoted on the outer end of the handle and connected with the locking pin by a rod 45, yieldingly holds the locking pin in a retracted inoperative position. Hence, by raising the operating handle from its position of rest alongside the ramp to a position shown in Figure 3, and engaging the pin 41 with the keeper 42 by depressing the squeeze grip 44, the extension lip may be swung about its hinge axis to a predetermined raised position short of alignment with the ramp by swinging the handle down towards its lowered position as shown in Figure 4, where it will be held by a releasable latch designated generally by the numeral 50.

Figure 3:
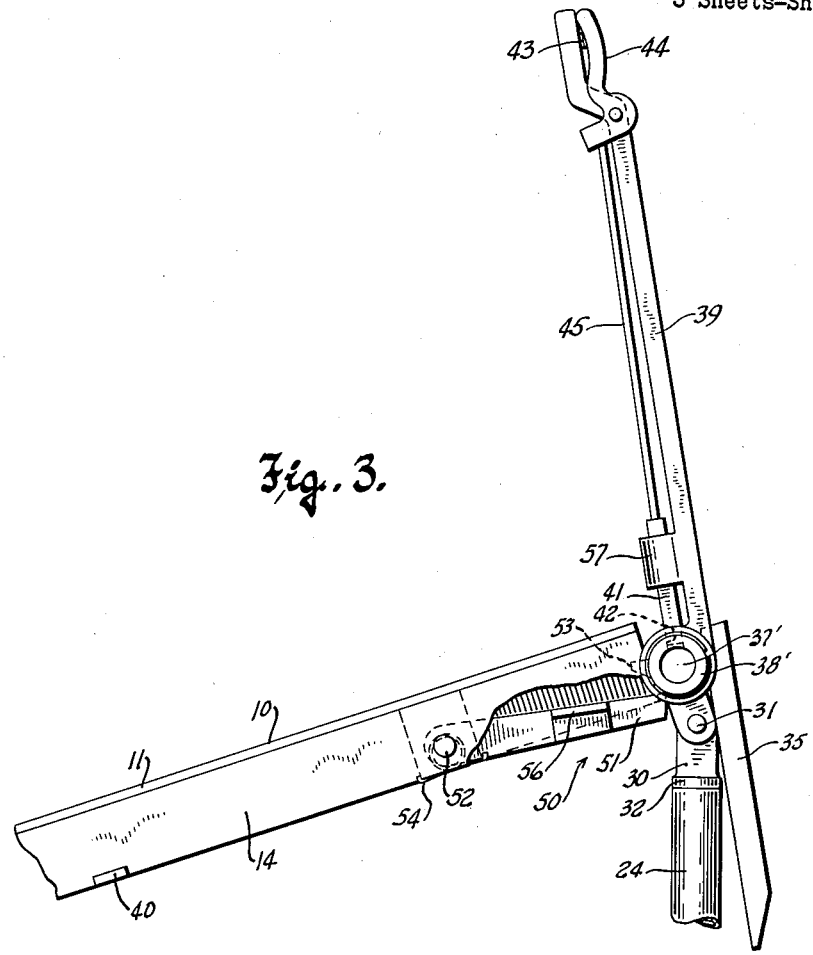
Figure 3 is a view in side elevation and at an enlarged scale, of the front end portion of the ramp and its extension lip, with parts broken away and in section, said view showing the extension lip hanging down from the front edge of the ramp.
Figure 4:
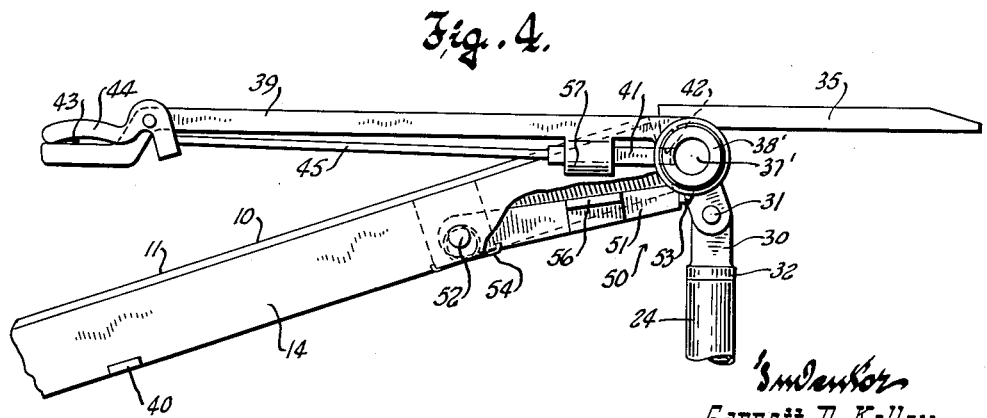
Figure 4 is a view similar to Figure 3 but showing the extension lip swung to a raised position preparatory to being lowered onto the floor or bed of a truck.

The latch 50 comprises a simplified pawl and ratchet consisting of a pawl 51 pivotally mounted at the underside of the ramp, as at 52, and a finger 53 secured to the tube 38' and projecting substantially radially therefrom in position to be engagable by the outer free end of the pawl which is yieldingly urged upwardly by a spring 54 to at all times have its free end bear against the tube 38' and automatically engage behind the finger 53 when the extension lip is raised and the finger is swung around to its position shown in Figure 3. In essence, therefore, the finger 53 may be considered a single tooth ratchet.

With the latch 50 thus engaged, the operating handle may be released. Such release of the operating handle, however, does not, of itself, cause the same to drop to its normal position, since the friction between the locking pin 41 and the edge of the hole or keeper 42 is sufficient to overcome the force of the spring 43. Thus, unless the squeeze-grip 44 is intentionally actuated to assist the spring 43 to withdraw the locking pin from the hole or keeper 42, the operating handle remains in its partially lowered position shown in Figure 3.

With the extension lip elevated to this predetermined intermediate or partially raised position, and with a truck or carrier in place, the ramp may be lowered against the bias of the counter-balancing torsion springs by simply walking out onto the ramp. As the ramp is forced down, the extension lip first engages the bed or floor of the truck or carrier and then swings up into coplanar alignment with the ramp as the ramp comes to rest in its operative position providing a bridge between the carrier and the dock, as shown in Figure 4. In this position the ramp may be inclined either upwardly or downwardly, or may be perfectly horizontal, depending upon the height of the truck bed with respect to the level of the dock or platform. The described lowering of the ramp is, of course, not opposed by the holding device 25, but upward movement of the ramp by the torsion springs is opposed thereby as a result of the cam 26 gripping the strut 24 and thereby restraining the springs. It should be noted, though, that this restraint upon the biasing springs does not prevent the ramp from rising with the carrier as the load thereon decreases.

The instant the weight of the extension lip is borne by the truck or carrier, the frictional force holding the locking pin 41 in engagement with the keeper 42 on the tube 38' is released and, as a result, the loaded spring 43 retracts the locking pin and the operating handle drops freely to its lowered position of rest. In dropping down to this position, the operating handle disengages the latch 50 and holds it in its disengaged condition but it is actually the spring 43 which effects the release of the handle in consequence of the upward movement of the extension lip. With the latch thus released, the extension lip or apron drops automatically to its pendant position hanging down from the front edge of the ramp, as the truck or carrier pulls away.

To enable the released handle to disengage the latch, the pawl 51 has an arm 56 fixed thereto and extending laterally therefrom, to underlie the operating handle and be engagable by a finger 57 projecting therefrom. Obviously, these parts are so proportioned, as can be seen in Figure 4, that the dropping of the operating handle holds the free end of the pawl beyond the orbit of the outer end of the lug 53.

From the foregoing description taken in connection with the accompanying drawings, it will be readily apparent to those skilled in this art that the adjustable dockboard of this invention has numerous advantages over those heretofore available. Some of these advantages are: the fact that the ramp is positively and reliably held down at dock level and will not accidentally rise—hence overhead doors may be used with assurance against damage resulting from unintentional elevation of the ramp; the simplicity which characterizes the preparation of the dockboard for use; the automatic return of the extension lip to its dependent position as the truck pulls away; the fact that the extension lip closes the front of the depression or shallow pit in which the unit is installed; and, finally, the overall simplicity and ruggedness of the entire structure.

What is claimed as my invention is:

1. An adjustable duckboard comprising: a ramp member having front and rear edges; means hingedly mounting the ramp member at its rear edge for up and down swinging movement about a horizontal axis; means biasing the ramp member upwardly; releasable holding means acting in opposition to the biasing means to restrain the same from raising the ramp member; manually operable means to release the holding means and permit the biasing means to raise the ramp member; a lip member hinged to the front edge of the ramp member and swingable about its hinge axis from a pendant position hanging down from the front edge of the ramp member to an operative position at which the lip member is elevated and forms an extension of the ramp member; said members having cooperating means to preclude upward swinging movement of the lip member relative to the ramp member beyond said operative position; means to swing the lip member toward its operative position; releasable latch means to support the lip member in a predetermined raised position, short of its operative position without interfering with swinging motion of the lip member to its operative position, so that upon lowering of the ramp member from a raised position while the lip member is supported by the latch means and a carrier is in place in front of the dockboard, the lip member comes to rest upon the floor of the carrier and is thereby swung to its operative position bridging the gap between the carrier floor and the ramp member, said latch means comprising a part movably mounted on one of said members and an abutment on the other of said members with which said part is engageable; and means operable in consequence of movement of the lip member with respect to the ramp member as the lip member comes to rest upon the carrier floor during lowering of the ramp member, to effect movement of said part away from said abutment, so that when the carrier moves away the lip member automatically drops to its pendant position hanging from the front edge of the ramp member.

2. The adjustable dockboard of claim 1, wherein said movably mounted part of the latch means is biased toward its operative abutment engaging position so that engagement of the latch means takes place automatically when the lip member reaches its said predetermined position during swinging movement of the lip member toward its operative position.

3. The dockboard of claim 1, wherein the means to swing the lip member toward its operative position comprises: an operating handle having a hub; means pivotally mounting the operating handle by its hub for swinging movement about the axis of the hinge connection between the lip member and the ramp member; a keeper fixed with respect to the lip member and located at a point spaced from said hinge axis but adjacent to the hub of the operating handle to rotate about said axis in an orbit close to the handle hub; and a spring biased locking pin movably mounted on the operating handle adjacent to its hub and manually operable against the bias thereon into engagement with the keeper to thereby provide a releasable torque transmitting connection between the handle and the lip member.

4. The dockboard of claim 3, wherein the operating handle is located directly adjacent to one side edge of the ramp member and normally occupies a position of rest alongside said side edge of the ramp member; and wherein the keeper is so placed with respect to the lip member that to engage the locking pin with the keeper when the lip member is in its pendant position requires raising the handle to an upright position, and lowering of the handle through a predetermined arc after engagement of the locking pin with the keeper brings the lip member to its predetermined raised position.

5. The dockboard of claim 3, wherein said means for effecting disengagement of said movably mounted part of the latch means from said abutment includes cooperating abutments on the handle and said movably mounted part, which abutments are engageable upon dropping of the handle to its normal position of rest.

6. In an adjustable dockboard: a ramp having front and rear edges; means hingedly supporting the ramp at its rear edge; biasing means; a member connected with the ramp and said biasing means through which the biasing means acts to impart upward bias on the ramp; and means to restrain the biasing means and thus enable the ramp to occupy a lowered position, said restraining means comprising a unidirectional manually releasable brake positioned to grip said member and hold it against movement by the biasing means.

7. The adjustable dockboard of claim 6; wherein said member is a strut pivotally connected with the ramp and occupying a substantially vertical position, the biasing means tending to move the strut upward.

8. The adjustable dockboard of claim 6, wherein the unidirectional brake is biased toward its operative position so that it automatically grips and restrains said member against movement by the biasing means.

9. In an adjustable dockboard, the structure set forth in claim 7, wherein said unidirectional brake comprises a fixed support slidably engaging one side of the strut; a cam at the opposite side of the strut; means mounting the cam for rotation about an axis fixed with respect to said fixed support so that the cam, in its operative position clamps the strut between it and the fixed support, the cam being shaped to be self-energizing; and means biasing the cam to rotate toward its operative position.

10. An adjustable dockboard comprising the combination of: a loading dock; a ramp having front and rear edges; means hingedly connecting the rear edge of the ramp with the loading dock and mounting the dock for movement from a cross-traffic position at which the front edge of the ramp is substantially in line with the edge of the dock, to a raised position; a strut; means on the dock mounting the strut for substantially vertical movement beneath the front edge portion of the ramp; a load supporting pivotal connection between the upper end of the strut and the ramp through which the strut may support the ramp and raise the same; spring means acting upon the strut tending at all times to move the same upwardly; and manually releasable unidirectional brake means acting upon the strut to restrain the same against upward movement by the spring means without interfering with free downward movement of the strut.

References Cited in the file of this patent

UNITED STATES PATENTS

| | | |
|---|---|---|
| 1,160,506 | Goss | Nov. 16, 1915 |
| 2,714,735 | Watson | Aug. 9, 1955 |
| 2,843,865 | Loomis | July 22, 1958 |
| 2,904,802 | Hartman | Sept. 22, 1959 |